United States Patent
Wang

[19]

[11] Patent Number: 6,140,866
[45] Date of Patent: Oct. 31, 2000

[54] FILTERING DEVICE COMPRISING A CONTROL CIRCUIT AND AN ELECTRICAL APPARATUS COMPRISING SUCH A DEVICE

[75] Inventor: Miao-Xin Wang, Fontaine, France

[73] Assignee: Schneider Electric SA, France

[21] Appl. No.: 09/121,589

[22] Filed: Jul. 24, 1998

[30] Foreign Application Priority Data

Aug. 21, 1997 [FR] France .................................. 97 10669

[51] Int. Cl.[7] ...................................................... H03B 1/00
[52] U.S. Cl. ............................................. 327/552; 363/39
[58] Field of Search .................................. 323/205, 207, 323/208, 209, 210, 211; 327/551, 552, 553, 555, 556, 557, 558, 559; 363/39, 47, 48

[56] References Cited

U.S. PATENT DOCUMENTS

| | | | |
|---|---|---|---|
| 4,247,888 | 1/1981 | Angquist | 363/47 |
| 4,385,244 | 5/1983 | Suzuki | 307/520 |
| 4,567,424 | 1/1986 | Dobsa et al. | 323/210 |
| 4,857,821 | 8/1989 | Takeda | 323/210 |
| 5,367,197 | 11/1994 | Klerfors | 307/105 |
| 5,568,042 | 10/1996 | Nyberg et al. | 323/211 |
| 5,668,418 | 9/1997 | Carlsson et al. | 307/105 |
| 5,693,988 | 12/1997 | Bettega et al. | 307/105 |
| 5,731,965 | 3/1998 | Cheng et al. | 363/41 |
| 5,737,198 | 4/1998 | Larsen et al. | 363/40 |
| 5,844,791 | 12/1998 | Swamy | 363/47 |
| 5,910,889 | 6/1999 | Larsen et al. | 363/40 |

FOREIGN PATENT DOCUMENTS

| | | |
|---|---|---|
| 0 645 866 A1 | 3/1995 | European Pat. Off. |
| 0 742 631 A2 | 11/1996 | European Pat. Off. |

OTHER PUBLICATIONS

"Effects of Harmonic Distortion of the Supply Voltage on the Optimum Performance of a Thyristor Controlled Reactor–Type Compensator;" Gutierrez J. et al.; ICEE Proceedings: Science, Measurement and Technology, vol. 141, No. 1; Jan. 1, 1994. pp. 15–19, XP000426401, *the entire document*.

*Primary Examiner*—Jeffrey Zweizig
*Attorney, Agent, or Firm*—Parkhurst & Wendel, L.L.P.

[57] ABSTRACT

The filtering device comprises at least one passive filtering cell controlled by an electronic switch and a control device. Said control device receives a signal representative of an electrical quantity of an electrical distribution line for example a load current. Then a processing circuit of the control circuit extracts a signal representative of a harmonic frequency to be eliminated from said electrical quantity and controls a generator generating control signals of said switch. Said signals control closing or opening of the switch at a mean frequency appreciably equal to the frequency of the harmonic to be eliminated or attenuated.

20 Claims, 8 Drawing Sheets

FILTERING DEVICE COMPRISING A CONTROL CIRCUIT AND AN ELECTRICAL APPARATUS COMPRISING SUCH A DEVICE

BACKGROUND OF THE INVENTION

The invention relates to a filtering device comprising at least one passive filtering cell connected to a line of an electrical power system in which disturbance harmonic currents are liable to flow, and to an electrical apparatus comprising at least one such device.

Filtering devices are used to eliminate or attenuate harmonic currents or voltages in electrical power distribution systems. Harmonic currents are caused by non-linear loads connected to the power distribution systems. The most common disturbance loads are chopping power supplies, and converters or regulators comprising electronic power components.

An increase of the harmonic current or voltage ratios in the power distribution system is liable to disturb operation or to damage sensitive electrical loads. To limit the harmonic current or voltage ratio, it is known to use filtering devices connected on lines of the power system.

Filtering devices generally comprise passive filters and active filters. The passive filters operate as current sinks and absorb the harmonic components of frequencies appreciably equal to the resonance frequencies of said filters. The active filters enable a sinusoidal current to be reestablished in the power system by compensating the currents deformed by non-linear loads. Compensation is performed by injecting a correction current in parallel into the power system. The power system current then corresponds to the sum of the deformed load current and of the correction current.

Passive filters generally comprise filtering cells each comprising an inductor in series with a capacitor. Each filtering cell is tuned to a harmonic frequency of the disturbance currents. To be efficient, these filters have to be perfectly tuned to said harmonic frequency. But it is very difficult to obtain high-precision passive components for high powers. Moreover, the characteristics of the components are liable to change with aging or when the operating temperature varies. Another difficulty linked to the use of passive filters creates interactions between the cells and modifies the tuning frequencies of said cells. Likewise, connecting reactive power compensation capacitors on the lines creates disturbances in the filtering devices by modifying the tuning frequencies. Narrow-band passive filters can also lose their efficiency if the fundamental frequency of the power system varies, even in small proportions.

Active filters are less sensitive to electrical installation configuration variations as they are generally provided with servo-controlled control devices. However, active filters are limited in power because of the electronic components they comprise. Linear electronic power components, such as transistors, are in fact limited in voltage and current.

Hybrid filtering devices exist comprising passive filters and active filters. However, these devices are complex and costly. They are generally designed for very specific applications.

SUMMARY OF THE INVENTION

The object of the invention is to achieve a filtering device having a low sensitivity to impedance variations of a power system and to component value drifts.

To achieve this object, the filtering device comprises electronic switching means connected in series with said passive filtering cell, and control means connected to said switching means and to first means for measuring an electrical line quantity, the control means controlling the switching means according to at least one preset harmonic frequency of a signal representative of the electrical line quantity supplied by the first means for measuring so as to attenuate disturbance currents having said at least one harmonic frequency.

Advantageously, the resonance frequency of the at least one passive filtering cell is higher than at least one preset harmonic frequency.

Preferably, the switching means are controlled to closing by pulse signals and to opening by passage at zero of a filtering current flowing through them.

Notably, the switching means comprise two thyristors connected head-to-tail.

In a preferred embodiment, the control means supply to the switching means a first pulse signal to order turn-on of the positive half-waves of a filtering current, and a second pulse signal to order turn-on of the negative half-waves of said filtering current.

Preferably, the first and second pulse signals are appreciably in phase opposition.

Advantageously, the control means comprise pulse generating means supplying the first and second pulse signals and synchronization means connected to the power system line and to said generating means to synchronize the pulse signals with a signal representative of the power system line voltage.

To control the filtering current amplitude, the control means comprise means for phase modulation between the first and second pulse signals according to a signal representative of the voltage of said at least one power system line.

In a particular embodiment, the control means comprise signal processing means connected to the first means for measuring an electrical line quantity to extract a signal representative of said at least one harmonic frequency of said electrical line quantity signal.

Preferably, the filtering device comprises second current measuring means connected to the signal processing means to supply a signal representative of a filtering current flowing in at least one filtering cell, said signal processing means comparing the signal representative of a filtering current and the signal representative of said at least one harmonic frequency of the electrical line quantity signal.

The signal processing means determine an amplitude difference between the signal representative of said at least one harmonic frequency of the electrical line quantity signal and the signal representative of a filtering current to servo control the switching means in such a way as to reduce said at least amplitude difference.

The signal processing means determine a phase difference between the signal representative of said at least one harmonic frequency of the electrical line quantity signal and the signal representative of a filtering current to control the switching means so as to reduce said phase difference.

To linearize the filtering current, the filtering device comprises an inductor connected in parallel on the switching means.

According to a development of the invention, the filtering device comprises several passive filtering cells tuned to different frequencies and each controlled by different switching means, the control means controlling each switching means according to different harmonic frequencies.

According to a first alternative embodiment, the first means for measuring an electrical line quantity comprise current measuring means arranged on said power system line between a disturbance electrical load and a filtering cell.

According to a second alternative embodiment, the first means for measuring an electrical line quantity comprise current measuring means arranged on said at least one power system line between an electrical power source and said at least one filtering cell.

According to a third alternative embodiment, the first means for measuring an electrical quantity comprise voltage measuring means connected to said at least one power system line.

In other embodiments, the filtering device can comprise active filtering means connected to a line of the electrical power system, a common control device connected to said switching means and to the active filtering means, and means for measuring supplying a signal representative of a total filtering current, said common control device comprising the control means connected to the switching means.

An electrical apparatus comprises at least one filtering device according to the invention as defined above.

The electrical apparatus can also comprise an active filtering device. Advantageously, in this embodiment, the electrical device comprises a common control device to control the active filtering device and the switching means.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
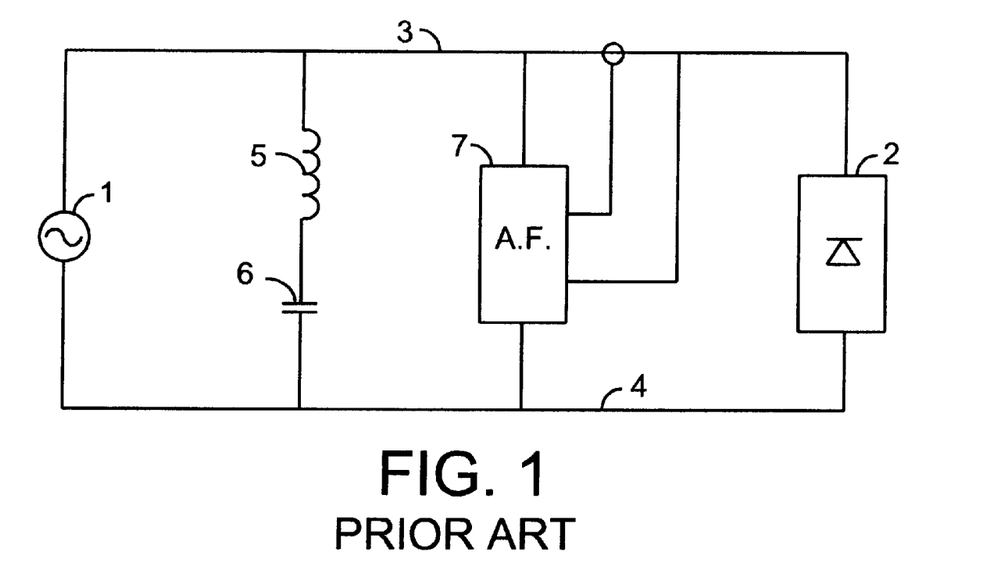
FIG. 1 shows the block diagram of an electrical installation comprising a known filtering device.

Electrical installations such as the one represented in FIG. 1 generally comprise at least one electrical power source I and at least one electrical load 2 connected by lines 3 and 4. When an electrical load 2 has a non-linear behavior, disturbance currents flow in the connecting lines 3 and 4. To eliminate or attenuate these disturbance currents, filtering devices are connected to said lines 3 and 4. A filtering device can comprise, as in FIG. 1, a passive filtering cell comprising an inductor 5 and a capacitor 6 connected in series. These elements form a resonant circuit which absorbs the currents whose frequency is appreciably equal to that of the resonance frequency. It is also possible to use active filters 7 to attenuate the disturbance effects of the current or voltage harmonic components. The active filters connected to the connecting lines 3 and 4 inject or absorb currents to compensate the deformations of the line currents or voltages.

Passive filters must have components of great precision to be able to absorb current harmonic components efficiently. This precision is very difficult to obtain as it requires precise adjustment. In addition, the characteristics of components vary in time and according to temperature.

Active filters achieved essentially with electronic components of transistor type are not suitable for very high powers.

In an embodiment of the invention, a filtering device comprises at least one passive filtering cell connected in series with an electronic switching device to control a current flowing in said passive filtering cell. The filtering precision thus no longer depends on the precision of the cell but on a control circuit of the switching device.

Advantageously, a device according to the invention can adapt to variations of power system impedance and frequency. A device according to the invention can be made to operate at different power system frequencies, for example at 50 Hz and 60 Hz, without modifying the passive filtering cell.

Figure 2:
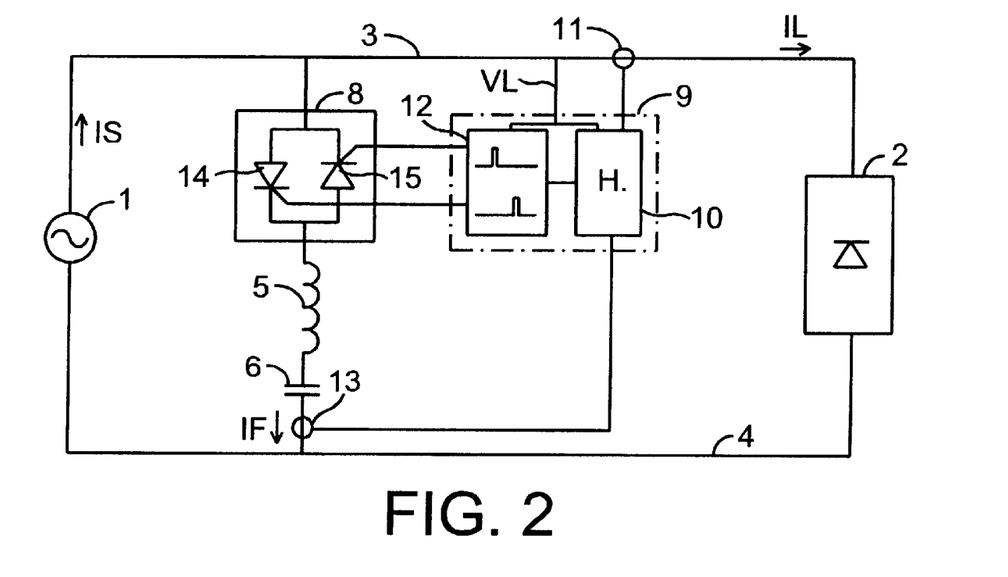
FIGS. 2 and 3 represent a first and second diagram of filtering devices according to embodiments of the invention detecting current disturbances.

A first embodiment is represented in FIG. 2. It comprises a passive filtering cell composed of an inductor 5 and a capacitor 6, and an electronic switch 8 connected in series with said filtering cell. The switch 8 is controlled by a control circuit 9 which supplies control signals according to electrical signals measured on at least one line of the power system.

The control circuit 9 comprises a signal processing circuit 10 connected notably to a current sensor 11 supplying a signal representative of a line current IL flowing in the disturbance load 2. The processing circuit 10 determines the characteristics of a harmonic current to be attenuated and supplies a control signal to a control signal generator 12. In order to improve the filtering efficiency, the device of FIG. 2 comprises a current sensor 13 connected in series with the passive filtering cell to supply to the processing circuit 10 a signal representative of a filtering current IF. The processing circuit extracts from the line current signal IL a value representative of the harmonic component to be attenuated HIL and compares this value to the signal representative of the filtering current IF. Then the circuit 10 controls the generator 12 in such a way that the filtering current is in phase opposition and of the same amplitude as compared to the harmonic signal. Thus, in this embodiment, the control circuit 9 operates according to a servo-control loop in order to re-establish a correct source current IS.

Advantageously, the processing circuit 10 and the generator 12 receive a signal representative of a tine voltage VL to synchronize determination of the values representative of the phase of the harmonic components to be attenuated HIL and supply of the control signals of the switch 8.

Preferably, the electronic switch 8 comprises electronic power components controlled to closing by pulses and opening when the current flowing through them passes zero. These components are advantageously thyristors which enable strong currents to be switched and can withstand high voltages. Thus, in a preferred embodiment, the switch 8 comprises two thyristors 14 and 15 connected head-to-tail in series with the passive filtering cell. A first thyristor 14 turns on the positive half-wave and a second thyristor 15 turns on the negative half-wave of the filtering current IF. To control the thyristors 14 and 15, the generator 12 supplies control pulses to the gates of said thyristors.

In order to avoid the drawbacks due to the imprecisions and variations of characteristics of the passive components 5 and 6, the switch 8 is controlled at a mean frequency appreciably equal to the frequency of the harmonic component HIL to be attenuated. With a switch 8 with two thyristors, the pulse signals supplied by the generator 12 to each thyristor are appreciably in phase opposition or staggered by one half-wave.

Figure 3:
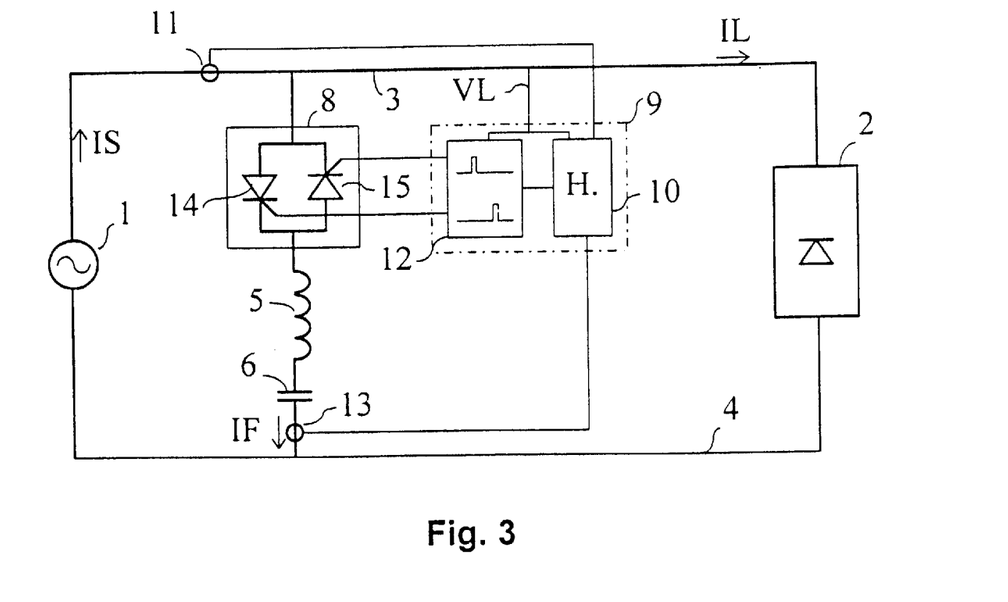

FIG. 3 shows a second embodiment wherein the current sensor 11 is connected on a line 3 between the source 1 and the passive filtering cell 5 and 6 in series with the switch 8. In this case, the current sensor 11 measures the source current IS and the control circuit controls the switch so as to eliminate or attenuate disturbance harmonic currents generated by the load 2 which could be propagated on the source current. The processing circuit 10 extracts from the source current IS a signal representative of a current harmonic HIS to be eliminated and controls the generator 12 to decrease said signal HIS. Thus, when a signal HIS occurs or when its amplitude increases, the control circuit 9 commands the switch 8 to adapt the filtering current IF and decrease the signal HIS.

Figure 4:
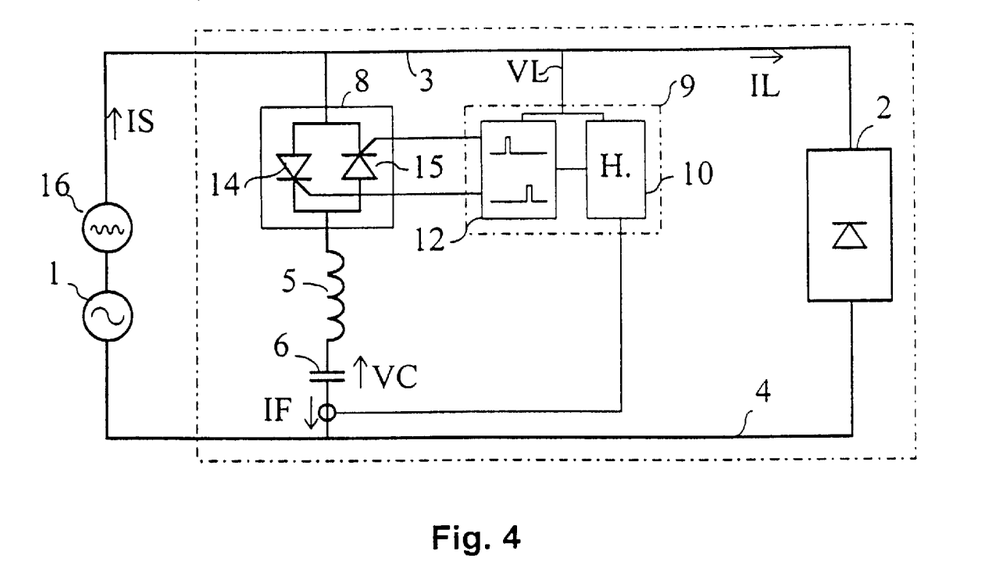
FIG. 4 represents a diagram of a filtering device according to an embodiment of the invention detecting voltage disturbances.

FIG. 4 shows a third embodiment wherein the measured electrical line quantity is a voltage VL of the line 3. In this embodiment, the processing circuit 10 extracts from a measured voltage signal VL a signal representative of a voltage harmonic HVL to be eliminated or attenuated. A harmonic voltage is representative of a harmonic current flowing in an impedance. In the diagram of FIG. 4, the harmonic voltage is represented by a harmonic voltage generator 16 connected in series with the electrical power source 1.

In this embodiment, the filtering device can eliminate harmonic components produced by the load 2 as in the previous two embodiments represented in FIGS. 2 and 3 but also disturbance harmonic components which may come from the power system. The device of FIG. 4 attenuates the disturbances generated by the non-linear behavior of the load 2 and protects said load against disturbances produced by other power system loads.

When a signal HVL occurs or when its amplitude increases, the control circuit 9 commands the switch 8 to modify the current IF and decrease the signal HVL.

Figure 5A:
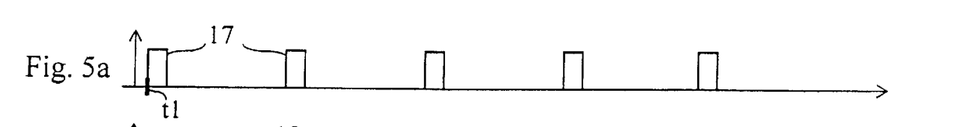
FIGS. 5a to 5d show electrical signals in a device according to the invention.
Figure 5B:
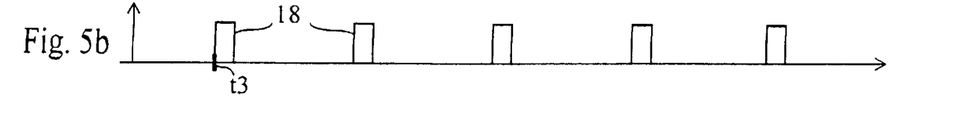
Figure 5C:
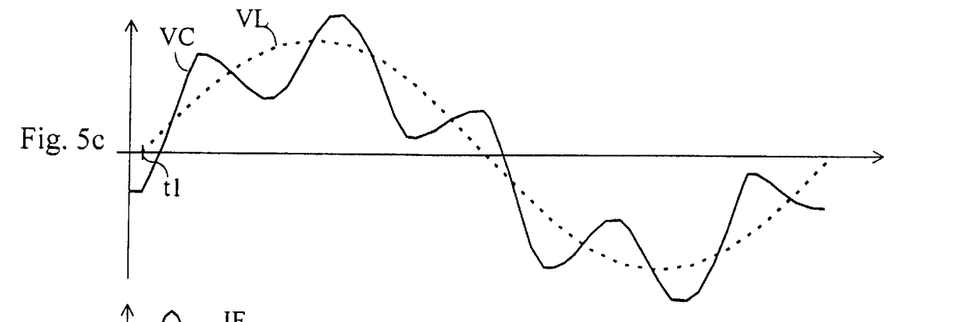
Figure 5D:
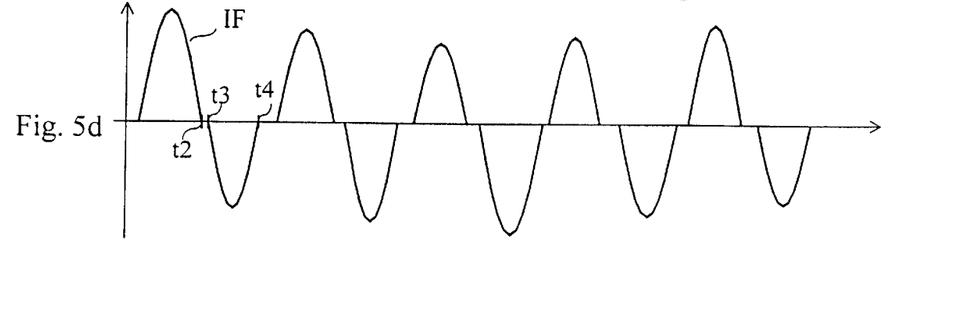

FIGS. 5a to 5d show signals from a filtering device according to an embodiment of the invention enabling a fifth order current harmonic to be eliminated or attenuated. The pulse signals 17 and 18 supplied by the generator 12 to control the two thyristors 14 and 15 are represented respectively in FIGS. 5a and 5b. In FIG. 5c there are represented a curve representative of a line voltage VL and a curve representative of a voltage VC of the capacitor 6. The filtering current IF is represented by a curve of FIG. 5d.

In the operating mode of FIGS. 5a to 5d, at a time t1, a signal pulse 17 orders turn-on of the thyristor 14. The voltage VL being greater than the voltage VC, a current IF flows in the passive filtering cell. The current form has the shape of a half sine-wave whose period depends essentially on the values of the capacitor 6 and of the inductor 5. The current IF induced by the inductor 5 charges the capacitor 6 at a voltage VC greater than VL, then this current is cancelled out when passing zero and the thyristor 14 is turned on at the time t2.

At a time t3, a pulse of the signal 18 orders turn-on of the thyristor 15. The voltage VC being greater than the voltage VL, a current IF of reverse polarity flows in the passive filtering cell 5 and 6, then stops at a time t4 before the occurrence of a next pulse of the signal 17.

The frequency of the pulses of each signal 17 or 18 is appreciably equal to the frequency of the harmonic component to be attenuated and the signals 17 and 18 are staggered by appreciably one half-wave corresponding to the frequency of said harmonic component to be attenuated. Advantageously, the current in the filtering cell passing through a thyristor is interrupted before another pulse orders turn-on of the other thyristor. Consequently, the resonance frequency of the passive filtering cell 5 and 6 is preferably higher than the frequency of the pulses of each signal 14 or 15 and higher than the frequency of the harmonic component to be attenuated. Thus, as in FIG. 5d, each sine-wave lobe corresponding to a half-wave ends before the beginning of turn-on of the next one and the corresponding thyristors turn off automatically.

Figure 6:
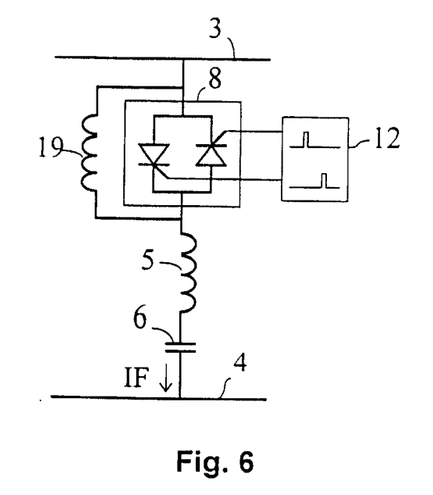
FIG. 6 represents a diagram of a filtering device comprising a smoothing inductor.
Figure 7:
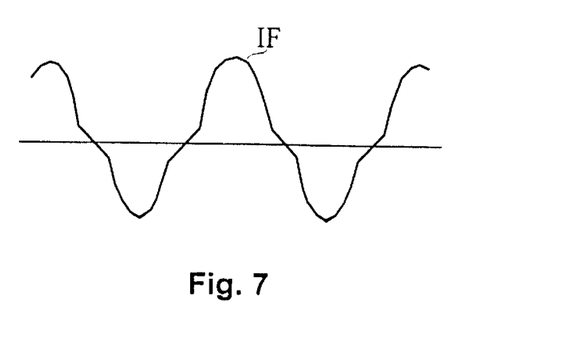
FIG. 7 shows a curve of a filtering current of a device according to FIG. 5, FIGS. 8a to 8c show current curves in a filtering device according to an embodiment of the invention.

Current interruption between two half-waves of the filtering current IF ensures efficient control of the current frequency but produces small disturbances when passing zero. To avoid these disturbances, a filtering device according to an embodiment of the invention represented in FIG. 6 can comprise a smoothing inductor 19 branch-connected or connected in parallel to the switch 8. FIG. 7 illustrates a curve representative of a filtering current IF of a device according to FIG. 6.

The filtering current IF has, in this case, a more continuous variation in two consecutive half-waves of opposite polarities.

Figure 8A:
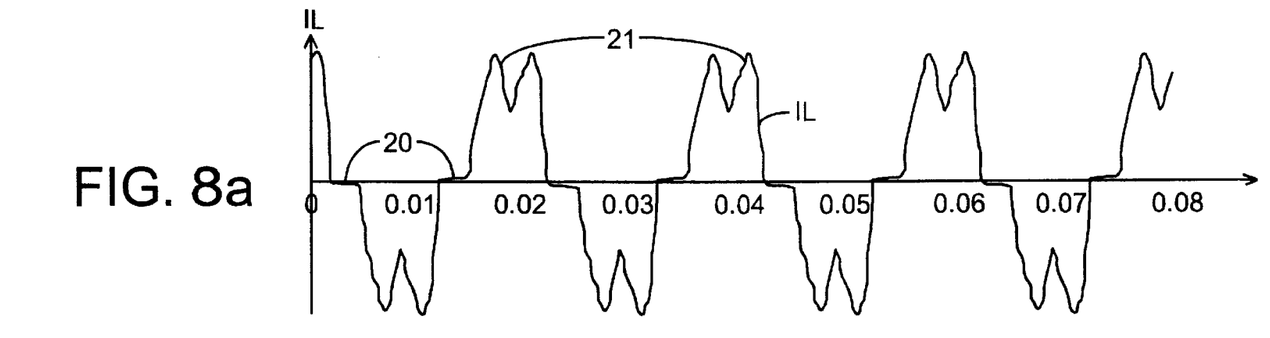
Figure 8B:
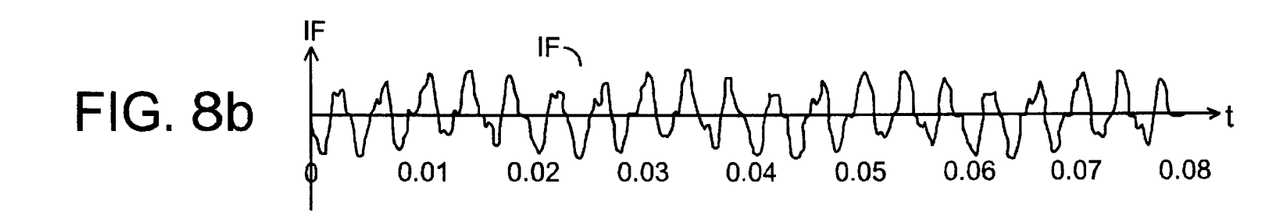
Figure 8C:
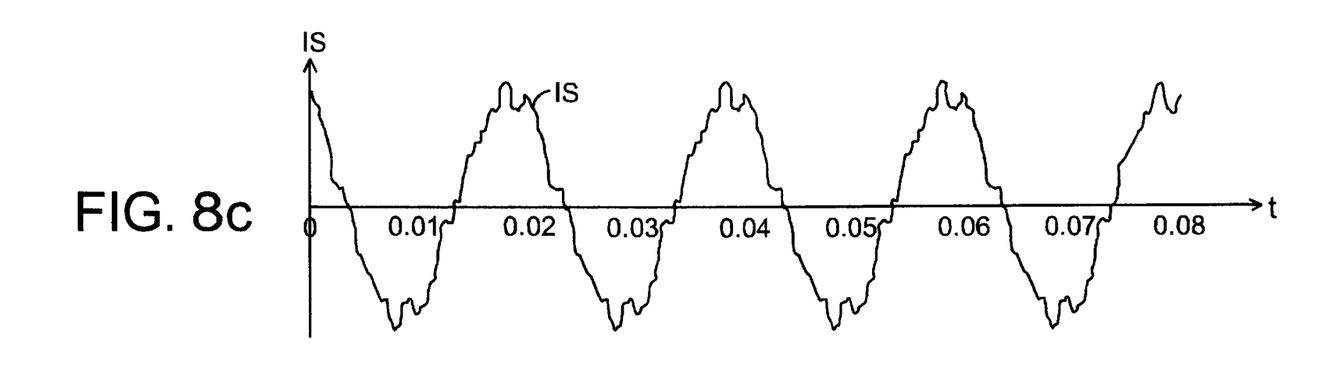

FIGS. 8a to 8c illustrate curves representative of currents flowing in an electrical circuit comprising a filtering device according to the invention. FIG. 8a represents a current IL flowing in a disturbance load 2. FIG. 8b represents a filtering current IF designed to compensate the disturbances generated by the load current at a preset harmonic frequency. FIG. 8c represents a filtered source current corresponding to the sum of the line current IL and of the filtering current IF.

The current IL of FIG. 8a has, in this embodiment, a fundamental frequency of 50 Hz corresponding to the frequency of the electrical voltage source 1. The load 2, notably comprising a rectifier, generates on the line 3 a harmonic component five disturbance with respect to the fundamental frequency. This disturbed current IL represented in FIG. 8a comprises flat parts 20 where the current is zero and sine-wave peaks disturbed by current valleys 21.

The processing circuit 10 analyzes the current of FIG. 8a and extracts the amplitude and phase of the disturbance current harmonic component five. Then the control signal generator sends pulses to the switch 8 to generate a filtering current IF. This filtering current represented in FIG. 8b compares the current of the disturbance harmonic component five.

The filtering current IF reestablishes an appreciably sinusoidal source current IS represented in FIG. 8c. The harmonic component five disturbances generated by the load are thus not propagated in the electrical power distribution system.

Figure 9A:
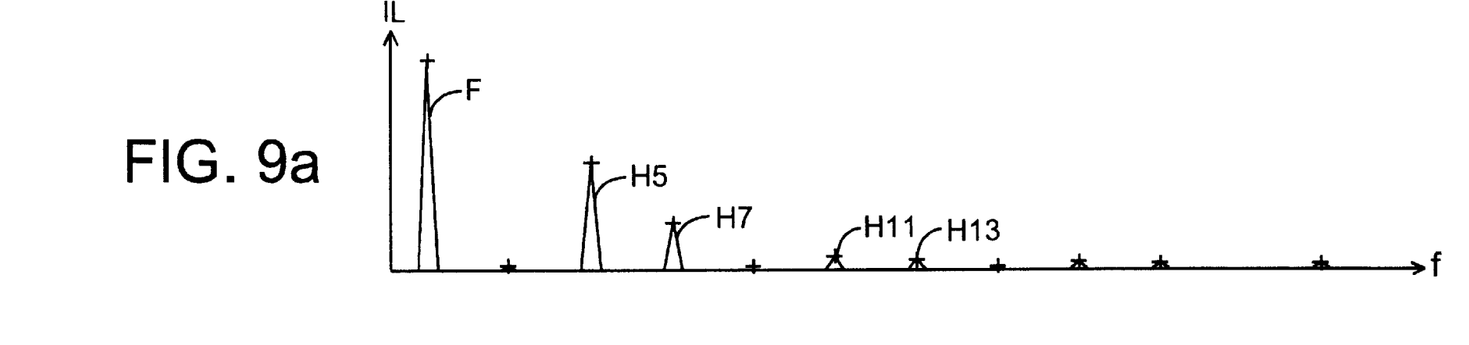
FIGS. 9a and 9b show harmonic components of current curves according to FIGS. 8a and 8c.
Figure 9B:
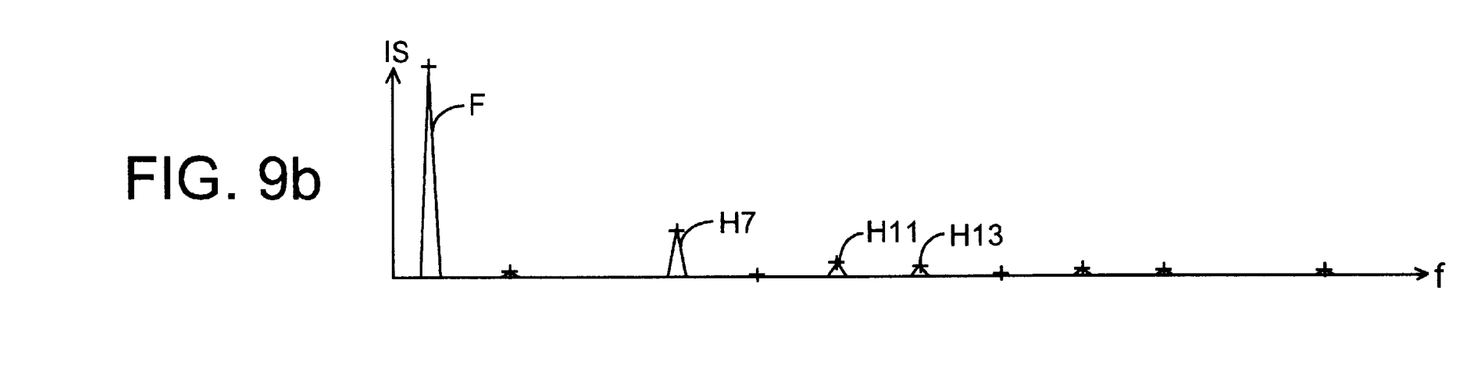

Curves representing spectral analysis according to the frequency of the load current IL and source current IS are represented respectively in FIGS. 9a and 9b. The current IL has a fundamental F and a harmonic component five H5 of high amplitudes as well as other harmonic components, in particular harmonic components seven H7, eleven H11 and thirteen H13.

In this embodiment, the filtering device attenuates the harmonic component five currents H5, and said harmonic component H5 is consequently no longer present in the frequency spectrum of the current IS of FIG. 9b. The fundamental frequency current F and the other harmonic components H7, H11 and H13 are to be found on the source current IS.

To improve filtering of the harmonic currents, a device according to the invention may comprise several passive filtering cells controlled by switches and a control circuit 9. For example, a filtering device can comprise a cell to attenuate the harmonic components five H5 and a cell to attenuate the harmonic components seven H7 which are the highest in the spectral analysis of FIG. 9a.

Figure 10:
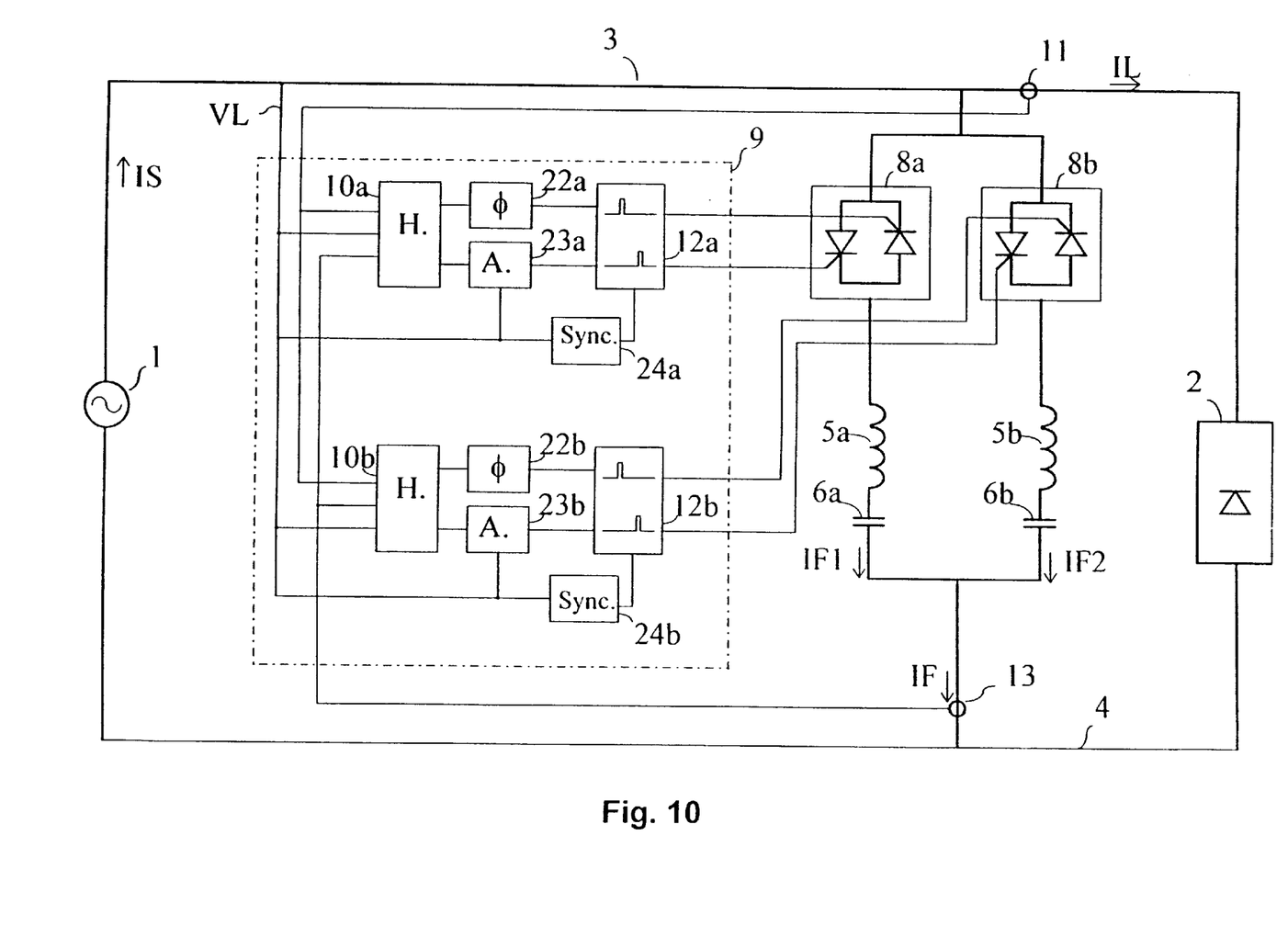
FIG. 10 represents the diagram of an embodiment of a filtering device according to the invention filtering two harmonic components.

An embodiment of a filtering device enabling two harmonic components to be attenuated or eliminated is represented in FIG. 10. This device comprises a first cell comprising an inductor 5a and a capacitor 6a in series with a switch 8a to compensate a first harmonic current and a second cell comprising an inductor 5b and a capacitor 6b in series with a switch 8b to compensate a second harmonic current. The control device 9 comprises a first processing circuit 10a and a first generator 12a to control the switch 8a and a second processing circuit I Ob and a second generator 12b to control the switch 8b.

In this embodiment, a first filtering current IF1, having a first frequency to compensate a first harmonic component, flows through the first cell 5a–6a, and a second filtering current IF2, having a second frequency to compensate a second harmonic component, flows through the second cell 5b–6b. The filtering current IF is then the sum of two currents IF1 and IF2 of different frequencies.

Each processing circuit 10a and 10b receives signals representative of the line current IL, of the filtering current IF and of the line voltage VL. The first circuit 10a extracts from the current signals it receives signals representative of a first harmonic frequency. These signals are applied to the input of a first control module 22d of the phase of the first filtering current IF1 having the first harmonic frequency. A first amplitude control module 23a receives the signals extracted by the first processing circuit 10a. This circuit controls the amplitude of the first filtering current IF1. This amplitude can advantageously be modulated according to the voltage VL of the line 3. For this, the circuit 23a receives a signal representative of the line voltage VL.

The phase and amplitude control modules 22a and 23a control the first generator 12a. Thus, the generator 12a supplies control pulses according to the amplitude and phase of the signals having the first harmonic frequency. Advantageously, the pulse signals 17 and 18 supplied by the generator 12a can be synchronized with the line voltage VL. For this purpose, a first synchronization module 24a is connected between the line voltage VL and the generator 12a.

Control of the second filtering current IF2 is performed in the same way as the first. The second processing circuit 10b extracts, from the current signals it receives, signals representative of a second harmonic frequency. A second phase control module 22b and a second amplitude control module 23b are connected between the processing circuit 10b and the generator 12b. Synchronization of the pulses supplied by the generator 12b is performed by a second synchronization module 24b.

Figure 11A:
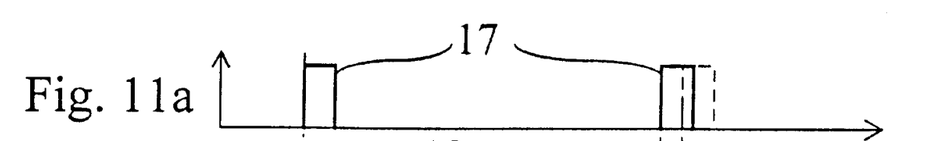
FIGS. 11a to 11d show current and voltage curves in a filtering device according to an embodiment of the invention comprising means for modulating the filtering current.
Figure 11B:
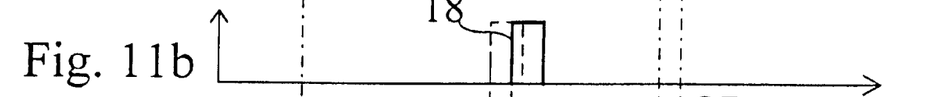
Figure 11C:
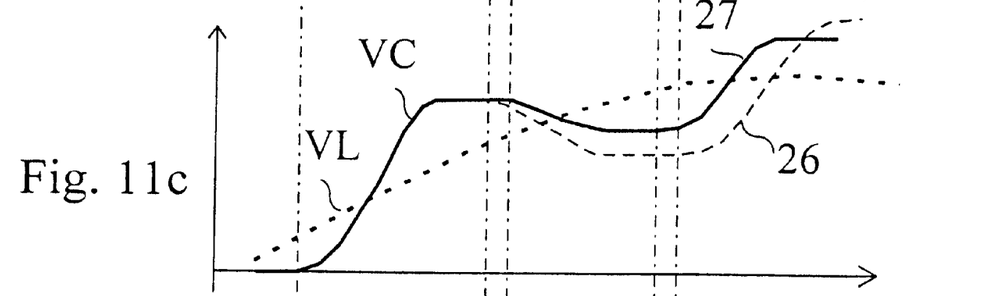
Figure 11D:
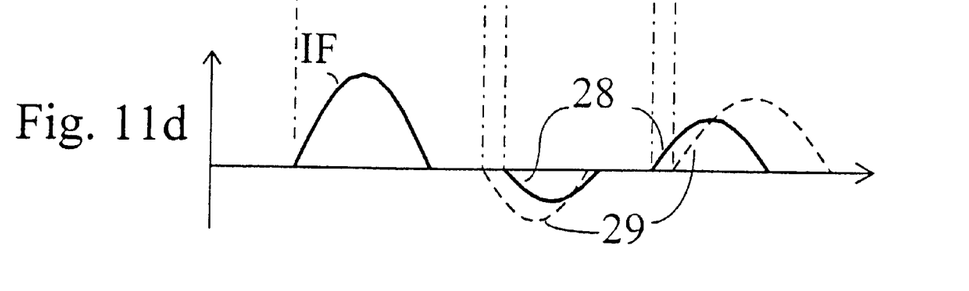

FIGS. 11a to 11d show the signals from a filtering device comprising amplitude control of the filtering current IF. To control said amplitude, the pulse signals 17 and 18 are no longer exactly in phase opposition but can be leading or lagging with respect to a middle position. FIG. 11a shows a first reference pulse 17 and a second pulse 17 leading with respect to its normal position. FIG. 11b shows a pulse 18 lagging with respect to its normal middle position. FIG. 11c shows the line voltage VL and the capacitor voltage VC as a function of normal pulses (curve 26) or modulated pulses (curve 27). FIG. 11d shows the current IF controlled in amplitude, In this figure, the current IF has a reduced amplitude (curve 28) compared to an initial curve 29 without modulation.

Although the pulses of the thyristor control signals 17 and 18 are no longer regular, the mean frequency of each signal remains identical to the frequency of the harmonic component to be attenuated.

Advantageously, in embodiments of the invention, pulse generators 12, 12a or 12b can also supply pulses according to the voltage VC of capacitors 6, 6a or 6b of filtering cells.

The filtering devices according to the invention can be used with active filters. In this case, for example, filtering devices according to an embodiment of the invention attenuate high power disturbances and an active filter attenuates other harmonic component disturbances of different frequencies. Consequently, the active filtering can be low power.

Figure 12:
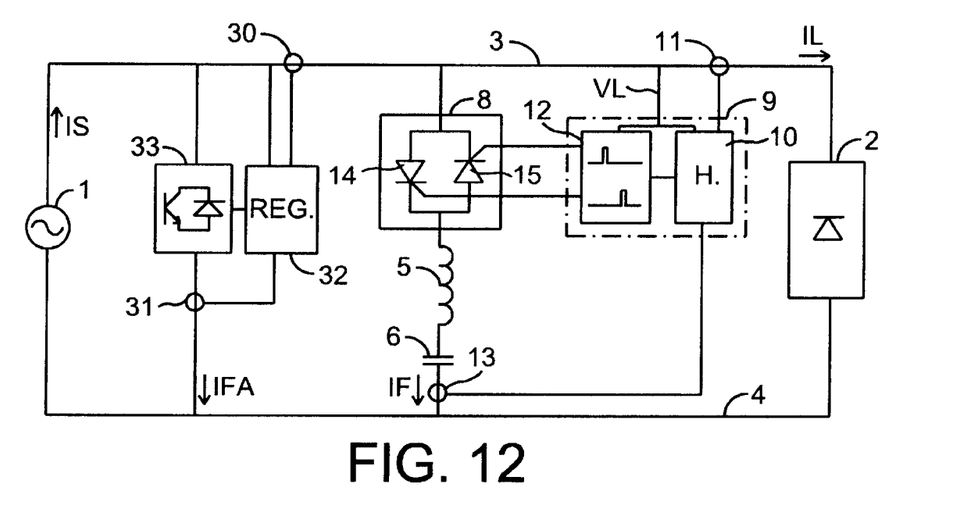
FIGS. 12 and 13 represent a first and second diagram of filtering devices according to embodiments of the invention associated to active filters.

An example of such an association is represented in FIG. 12. In this embodiment, an active filter comprising an electronic power circuit 33 is connected to the power supply lines 3 and 4. Control of the circuit 33 is performed by a regulating circuit 32 connected to said circuit 33, to a current sensor 30 supplying a signal representative of the line current IL, and to a current sensor 31 supplying a signal representative of an active filtering current IFA. The circuit 32 can also receive a signal representative of the line voltage VL.

Figure 13:
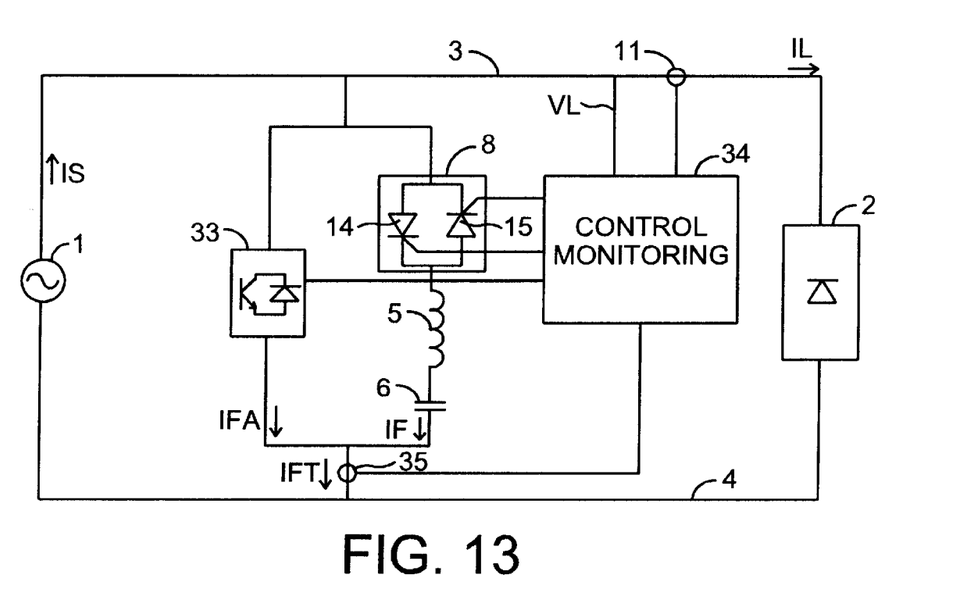

Advantageously, active filters can be integrated in filtering devices according to the invention. A diagram of an embodiment of a filtering device integrating an active filter is represented in FIG. 13. In this embodiment, a control circuit 34 is connected to the switch 8 and to the active filter 33 to control the two types of filtering. To reduce in particular the number of sensors, the circuit 34 receives signals representative of line currents IL supplied by the sensor 11, of line voltage VL, and of total filtering current IFT supplied by a sensor 35 measuring the current IFA flowing in the active filter and the filtering current IF flowing in the cell comprising the inductor 5 and capacitor 6. In this embodiment, the circuit 34 notably comprises the functions of the circuits 9 and 34 to process all the signals and control all of the filtering.

The circuits of the control devices 9 can be achieved in discrete manner as digital or analog components or partially or totally integrated in programmed form in a microprocessor-based device.

Devices according to embodiments of the invention can be connected in parallel in an electrical installation. Each device is able to operate to attenuate identical or different harmonic components. They can also be associated to different active or passive filtering devices or to reactive power compensation devices.

In a three-phase power system, filtering devices according to the invention can be star-connected or triangle-connected.

The switches 8 preferably comprise thyristors enabling a high electrical power to be switched with low losses but other semi-conducting power components can replace them perfectly well.

What is claimed is:

1. A filtering device, comprising:
   (a) at least one passive filtering cell connected to a line of an AC electrical power system having a fundamental frequency and in which disturbance harmonic currents may flow, the resonance frequency of said passive filtering cell being higher than a frequency of at least one preset order harmonic component frequency of the fundamental frequency of the power system;
   (b) electronic switching means connected in series with said passive filtering cell; and
   (c) control means connected to said switching means and to first means for measuring an electrical line quantity, said control means controlling said switching means according to said frequency of at least one preset order harmonic component frequency of a signal representative of the electrical line quantity supplied by the first means for measuring to attenuate disturbance current having said frequency of at least one preset order harmonic component frequency.

2. The filtering device according to claim 1 wherein the switching means are controlled for closing by pulse signals and for opening by passage at zero of a filtering current flowing through them.

3. The filtering device according to claim 1 wherein the switching means (8) comprise two thyristors connected head-to-tail.

4. The filtering device according to claim 1 wherein the control means supply to the switching means a first pulse signal to order turn-on of the positive half-waves of a filtering current and a second pulse signal to order turn-on of the negative half-waves of said filtering current.

5. The filtering device according to claim 4 wherein the first and second pulse signals are in phase opposition.

6. The filtering device according to claim 4 wherein the control means comprise pulse generating means supplying the first and second pulse signals and synchronization means connected to the power system line and to said generating means to synchronize the pulse signals with a signal representative of the power system line voltage.

7. The filtering device according to claim 4 wherein the control means comprise means for phase modulation between the first and second pulse signals according to a signal representative of the voltage of said at least one power system line.

8. The filtering device according to claim 1 wherein the control means comprise signal processing means connected to the first means for measuring an electrical line quantity to extract a signal representative of said at least one harmonic frequency of said electrical line quantity signal.

9. The filtering device according to claim 8 comprising second current measuring means connected to the signal processing means to supply a signal representative of a filtering current flowing in said at least one filtering cell, said signal processing means comparing the signal representative of a filtering current and the signal representative of said at least one harmonic frequency of the electrical line quantity signal.

10. The filtering device according to claim 9 wherein the signal processing means determine an amplitude difference between the signal representative of said at least one harmonic frequency of the electrical line quantity signal and the signal representative of a filtering current to servo control the switching means so as to reduce said at least amplitude difference.

11. The filtering device according to claim 9 wherein the signal processing means determine a phase difference between the signal representative of said at least one harmonic frequency of the electrical line quantity signal and the signal representative of a filtering current to control the switching means in such a way as to reduce said phase difference.

12. The filtering device according to claim 1 comprising an inductor connected in parallel on the switching means.

13. The filtering device according to claim 1 comprising several passive filtering cells tuned to different frequencies and each controlled by different switching means, the control means controlling each switching means according to different harmonic frequencies.

14. The filtering device according to claim 1 wherein the first means for measuring an electrical line quantity comprise current measuring means arranged on said power system line between a disturbance electrical load and at least one filtering cell.

15. The filtering device according to claim 1 wherein the first means for measuring an electrical line quantity comprise current measuring means arranged on said power system line between an electrical power source and said at least one filtering cell.

16. The filtering device according to claim 1 wherein the first means for measuring an electrical quantity comprise voltage measuring means connected to said at least one power system line.

17. The filtering device according to claim 1 comprising active filtering means connected to a line of an electrical power system, a common control device connected to said switching means and to the active filtering means, and means for supplying a signal representative of a total filtering current, said common control device comprising the control means connected to the switching means.

18. An electrical apparatus, comprising at least one filtering device including
   (a) at least one passive filtering cell connected to a line of an AC electrical power system having a fundamental frequency and in which disturbance harmonic currents may flow, the resonance frequency of said passive filtering cell being higher than a frequency of at least one preset order harmonic component frequency of the fundamental frequency of the power system;
   (b) electronic switching means connected in series with said passive filtering cell; and
   (c) control means connected to said switching means and to first means for measuring an electrical line quantity, said control means controlling said switching means according to said frequency of at least one preset order harmonic component frequency of a signal representative of the electrical line quantity supplied by the first means for measuring to attenuate disturbance current having said frequency of at least one preset order harmonic component frequency.

19. The electrical apparatus according to claim 18 comprising an active filtering device.

20. The electrical device according to claim 19 comprising a common control device to control the active filtering device and the switching means.

* * * * *